(12) United States Patent
Gawell et al.

(10) Patent No.: US 11,149,622 B2
(45) Date of Patent: Oct. 19, 2021

(54) MULTIPLE BANK EXHAUST SYSTEM COMPRISING REDUCTANT SUPPLY SYSTEM ARRANGED UPSTREAM OF A TURBINE

(71) Applicant: Scania CV AB, Södertälje (SE)

(72) Inventors: Anders Gawell, Stjärnhov (SE); Daniel Hjortborg, Rönninge (SE)

(73) Assignee: Scania CV AB, Södertälje (SE)

( * ) Notice: Subject to any disclaimer, the term of this patent is extended or adjusted under 35 U.S.C. 154(b) by 70 days.

(21) Appl. No.: 16/337,246

(22) PCT Filed: Aug. 22, 2017

(86) PCT No.: PCT/SE2017/050838
§ 371 (c)(1),
(2) Date: Mar. 27, 2019

(87) PCT Pub. No.: WO2018/063052
PCT Pub. Date: Apr. 5, 2018

(65) Prior Publication Data
US 2019/0301346 A1 Oct. 3, 2019

(30) Foreign Application Priority Data

Sep. 30, 2016 (SE) .................................. 1651286-5

(51) Int. Cl.
*F01N 13/10* (2010.01)
*F01N 3/20* (2006.01)
(Continued)

(52) U.S. Cl.
CPC ......... *F01N 13/107* (2013.01); *F01N 3/2066* (2013.01); *F02B 37/001* (2013.01);
(Continued)

(58) Field of Classification Search
CPC ............... F01N 13/107; F01N 2240/02; F01N 2340/02; F01N 2340/06; F01N 2610/02;
(Continued)

(56) References Cited

U.S. PATENT DOCUMENTS

2010/0313550 A1* 12/2010 Kopp .................. F01N 13/1805
60/286
2010/0319342 A1* 12/2010 Brown ................... F01N 3/2892
60/598

(Continued)

FOREIGN PATENT DOCUMENTS

DE 3821832 C1 11/1989
EP 2415988 A1 2/2012

(Continued)

OTHER PUBLICATIONS

Scania CV AB, Korean Application No. 10-2019-7009740, Office Action, dated Mar. 16, 2020.

(Continued)

*Primary Examiner* — Anthony Ayala Delgado
(74) *Attorney, Agent, or Firm* — Moore & Van Allen PLLC; W. Kevin Ransom (57) ABSTRACT

Provided is an exhaust system for an internal combustion engine comprising: a first exhaust conduit leading from a first exhaust bank of the engine to a first turbocharger turbine inlet arranged downstream of the first exhaust bank in the direction of travel of a first exhaust stream; a second exhaust conduit leading from a second exhaust bank of the engine to a second turbocharger turbine inlet arranged downstream of the second exhaust bank in the direction of travel of a second exhaust stream; an SCR catalyst arranged downstream of the first turbocharger turbine inlet and/or second turbocharger turbine inlet; and a reductant supply system comprising a distributor pipe and a reductant injector. The distributor pipe is configured to fluidly connect the first exhaust conduit to (Continued)

the second exhaust conduit upstream of the first turbocharger turbine inlet and second turbocharger turbine inlet, and the reductant injector is configured to supply a reductant to the distributor pipe.

22 Claims, 8 Drawing Sheets (51) Int. Cl.
    *F02B 37/00*     (2006.01)
    *F02B 37/02*     (2006.01)

(52) U.S. Cl.
    CPC ........ *F02B 37/025* (2013.01); *F01N 2240/02* (2013.01); *F01N 2340/02* (2013.01); *F01N 2340/06* (2013.01); *F01N 2610/02* (2013.01); *F01N 2610/11* (2013.01); *F01N 2610/1453* (2013.01); *Y02A 50/20* (2018.01); *Y02T 10/12* (2013.01)

(58) Field of Classification Search
    CPC ......... F01N 2610/11; F01N 2610/1453; F01N 3/2066; F02B 37/001; F02B 37/025; Y02A 50/2325; Y02T 10/144; Y02T 10/24
    See application file for complete search history.

(56) References Cited

U.S. PATENT DOCUMENTS

| | | | | |
|---|---|---|---|---|
| 2012/0198823 | A1* | 8/2012 | Amstutz | ............... F01N 3/2066 60/295 |
| 2014/0166393 | A1* | 6/2014 | Butler | ................. F01N 13/1805 181/228 |
| 2014/0331667 | A1 | 11/2014 | Kindl et al. | |
| 2017/0145888 | A1* | 5/2017 | Lipa | ........................ F01N 3/225 |

FOREIGN PATENT DOCUMENTS

| | | | |
|---|---|---|---|
| FR | 2893083 | A1 | 5/2007 |
| JP | 2006090259 | A | 4/2006 |
| JP | 2006336537 | A | 12/2006 |
| JP | 2006348811 | A | 12/2006 |
| JP | 2007127058 | A | 5/2007 |
| JP | 2008303837 | A | 12/2008 |
| JP | 2009008023 | A | 1/2009 |
| WO | 2012028768 | A1 | 3/2012 |

OTHER PUBLICATIONS

Scania CV AB, European Application No. 17856903A, Extended European Search Report, dated Apr. 15, 2020.
International Search Report for International Patent Application No. PCT/SE2017/050838 dated Sep. 20, 2017.
Scania CV AB, International Application No. PCT/SE2017/050838, Written Opinion, dated Oct. 20, 2017.
Scania CV AB, International Application No. PCT/SE2017/050838, International Preliminary Report on Patentability, dated Apr. 2, 2019.
Scania CV AB, Chinese Patent Application No. 201780066085.5, Second Office Action, dated May 28, 2021.

* cited by examiner

MULTIPLE BANK EXHAUST SYSTEM COMPRISING REDUCTANT SUPPLY SYSTEM ARRANGED UPSTREAM OF A TURBINE

CROSS-REFERENCE TO RELATED APPLICATIONS

This application is a national stage application (filed under 35 § U.S.C. 371) of PCT/SE2017/050838, filed Aug. 22, 2017 of the same title, which, in turn claims priority to Swedish Application No. 1651286-5 filed Sep. 30, 2016 of the same title; the contents of each of which are hereby incorporated by reference.

FIELD OF THE INVENTION

The present invention relates to an exhaust system for an internal combustion engine. The present invention further relates to a vehicle having such an exhaust system, and a method of adding a reductant to an exhaust stream of such an exhaust system.

BACKGROUND OF THE INVENTION

Emissions standards for motor vehicles are becoming increasingly stringent. Such standards typically specify maximum emission levels for a number of tailpipe pollutants including carbon monoxide (CO), hydrocarbons (HC), nitrogen oxides ($NO_x$) and particulate matter (PM). In order to meet the requirements of the present and presumably future standards, vehicles are required to be equipped with emissions reduction technologies. Such emissions reduction technologies suitable for diesel vehicles include exhaust gas recirculation (EGR), particulate filters, diesel oxidation catalysts (DOC), and selective catalytic reduction (SCR). Each technology has its own distinct advantages and disadvantages, and may increase the incidence of one pollutant while reducing the incidence of another. For example, EGR may reduce $NO_x$ emissions, but reduce fuel efficiency and increase particulate matter. Therefore, a number of technologies are commonly applied together in order to meet emissions standards.

Selective catalytic reduction (SCR) is an effective technology to reduce tailpipe nitrogen oxides ($NO_x$) emissions. It involves adding a reductant, such as ammonia, to the vehicle exhaust stream. The reductant, with the aid of a catalyst, reduces $NO_x$ in the exhaust stream to nitrogen gas ($N_2$) and water. In practical implementations in motor vehicles, an aqueous urea solution is used as a reductant and this urea solution is decomposed to ammonia and carbon dioxide in the hot exhaust stream.

Since SCR is implemented downstream of the engine as an exhaust aftertreatment, it does not affect the combustion performance of the engine in the same manner as for example EGR does. Therefore, it is desirable to be able to remove substantially all $NO_x$ from the exhaust stream using only SCR, without the need for EGR. However, this is not without difficulties. In order to produce the quantities of ammonia required to reduce substantially all $NO_x$, large quantities of urea solution must be injected into the exhaust stream. If the exhaust stream is sufficiently hot, the solution will evaporate and decompose to ammonia. The exact temperature that this occurs at depends on the injected mass flow of urea: the greater the mass flow, the higher the temperature required. At sub-optimal temperatures the urea solution may instead form deposits on surfaces of the exhaust conduit. Such deposits may include crystallized urea, as well as urea decomposition byproducts such as cyanuric acid. These deposits can be removed by heating the exhaust system at temperatures approaching 400° C., but such temperatures are rarely achieved during normal operation of the vehicle and therefore, special procedures must be adopted to remove the exhaust deposits.

A further difficulty with SCR is the requirement for efficient mixing in order to achieve uniform distribution of reductant over the entire surface area of multiple SCR catalyst substrates. The space available for mixing is extremely limited and the reductant is commonly injected into the exhaust stream shortly upstream of the SCR catalyst substrates. In order to improve mixing a mixing device, often resembling a turbine blade, is arranged in the exhaust pipe. However, even when using a mixing device, it is difficult to achieve sufficiently uniform mixing. Moreover, the presence of a mixing device in the exhaust pipe acts as an obstruction to flow, causing higher pressure upstream of the mixer (backpressure) and reducing the engine efficiency.

These problems may be solved by providing injection of the reductant further upstream in the exhaust system, preferably in proximity to the exhaust manifold outlet, upstream of any turbo turbine placed in the exhaust stream. The exhaust temperatures at the manifold outlet are significantly higher compared to for the typical placement of SCR injectors. The difference in temperature can be as much as 30-150° C. Moreover the thermal inertia at the exhaust manifold is lower, meaning that optimal operating temperatures are achieved much quicker after start up. This means that higher mass flows of reductant can be added, and the optimal operating window is larger as compared to downstream injection of reductant.

Injecting the reductant in proximity to the exhaust manifold outlet allows a much longer exhaust flow path to reach the SCR catalyst beds, providing improved mixing. This is especially so in the case where the engine is fitted with a turbo. The turbo turbine provides highly effective mixing of the exhaust gas and reductant. This means that no SCR-specific mixer is required and the backpressure caused by use of such a mixer may therefore be avoided.

DE 3821832 C1 describes an exhaust system comprising an exhaust-combining device. The exhaust-combining device is positioned upstream of a turbocharger where the separate pipes of the exhaust manifold converge. The exhaust-combining device comprises an injection chamber having a nozzle head in contact with the converging exhaust stream, and an injection member for injecting ammonia and a carrier gas into the injection chamber.

US 2010/0313550 A1 describes an exhaust system for an internal combustion engine. The exhaust system comprises a means for introducing reducing agent into the exhaust system after the convergence of the exhaust manifold and upstream of a turbine of a two-stage turbocharger. In one embodiment the engine may have a V-configuration, in which case separate means for introducing reducing agent are provided for each exhaust bank.

There remains a need for an improved means of adding a reductant to an exhaust stream.

SUMMARY OF THE INVENTION

The inventors of the present invention have identified a number of shortcomings with regard to prior art solutions for providing a reductant to an exhaust stream. Placing one or more injectors upstream of a turbine is a significant engineering challenge. The high temperatures that the injectors are exposed to may cause material failure. Furthermore, measures must be taken to ensure that the reductant solution in the injector is not prematurely exposed to high temperatures, which otherwise might lead to degradation and deposits forming in the injector nozzle. Furthermore, in systems having multiple turbine inlets, such as twin scroll turbocharger systems, normally one injector is required per turbine inlet. If a single injector is used for multiple turbine inlets, complex solutions for distributing the reductant are required, and even then the distribution cannot be regulated.

It is therefore an object of the present invention to provide an improved means of adding a reductant to an exhaust stream of an exhaust system having multiple turbo inlets. Another object of the present invention is to provide a means of adding a reductant that is simpler, more robust and requires fewer injectors than prior art solutions.

It is a further object of the present invention is to provide an improved means of controlling the distribution of reductant to multiple turbo inlets.

These objects are achieved by an exhaust system for an internal combustion engine according to the appended claims. The exhaust system comprises:
 a first exhaust conduit leading from a first exhaust bank of the internal combustion engine to a first turbocharger turbine inlet arranged downstream of the first exhaust bank in the direction of travel of a first exhaust stream;
 a second exhaust conduit leading from a second exhaust bank of the internal combustion engine to second turbocharger turbine inlet arranged downstream of the second exhaust bank in the direction of travel of a second exhaust stream;
 an SCR catalyst arranged downstream of the first turbocharger turbine inlet and/or second turbocharger turbine inlet; and
 a reductant supply system comprising a distributor pipe and a reductant injector.

The distributor pipe is configured to fluidly connect the first exhaust conduit to the second exhaust conduit upstream of the first turbocharger turbine inlet and second turbocharger turbine inlets, and the reductant injector is configured to supply a reductant to the distributor pipe.

Using such a system, reductant can be supplied by the reductant injector into the distributor pipe. Pressure pulses arising from the opening of engine exhaust valves will then act to blow the supplied reductant into one of the exhaust conduits. By timing the supply of the reductant to the distributor pipe, the reductant may be distributed in any desired manner between both exhaust conduits. Only a single reductant injector is required. Because the reductant injector supplies reductant to the distributor pipe and not directly to the exhaust conduits, it is not exposed to the full severity of the conditions in the exhaust conduits, making the system more robust. At the same time, the solution is constructionally simple, requiring few extra parts and removing the need for a mixer downstream of the injection site.

Thermal insulation may be arranged between a first end of the distributor pipe and the first exhaust conduit and between the second end of the distributor pipe and the second exhaust conduit. This further decreases the temperature prevailing in the distributor pipe, thus reducing reductant by-product formation and protecting the reductant injector.

The distributor pipe may be equipped with a cooling sleeve configured to circulate a fluid through the cooling sleeve. The cooling sleeve may be fluidly connected to a cooling system for the internal combustion engine. Alternatively, the cooling sleeve may be fluidly connected to a reductant storage tank. By actively cooling the distributor pipe, a sharp temperature gradient is obtained between the distributor pipe and exhaust conduits. This means that any reductant supplied to the distributor pipe is initially subject to temperatures too low to lead to by product formation. Upon being blown into an exhaust conduit, the reductant is rapidly subjected to the high temperatures of the exhaust stream and is vaporized without by-product formation. Thus, by-product formation and deposition in the exhaust system is greatly reduced.

The first turbocharger turbine inlet and second turbocharger turbine inlet may be associated with a single turbocharger turbine. Thus, the system is applicable to twin-scroll turbo systems.

The first turbocharger turbine inlet may be associated with a first turbocharger turbine and the second turbocharger turbine inlet may be associated with a second turbocharger turbine. Thus, the system is applicable to twin-turbo systems.

A wastegate may be arranged in association with the first turbocharger turbine inlet and/or the second turbocharger turbine inlet. Because the distribution of reductant is controllable, supply of reductant to the inlet having a wastegate may be avoided whenever the wastegate is opened. This avoids reductant bypassing the turbo turbine, and thus ensures good mixing of the reductant in the exhaust stream.

The first turbocharger turbine inlet may have a different geometry to the second turbocharger turbine inlet. Because the system of the present invention can control the distribution of reductant between the exhaust conduits, an optimal dosing of reductant can be obtained for each conduit regardless of whether the geometry is symmetric or not.

A collective exhaust conduit configured to convey the first exhaust stream and second exhaust stream may be arranged downstream of the first turbocharger turbine inlet and second turbocharger turbine inlet. This potentially allows the use of a single SCR catalyst to service both the first and second exhaust streams.

According to another aspect of the present invention, the objects of the invention are achieved by a method of supplying a reductant to an exhaust stream of an exhaust system as disclosed herein. The method comprises the steps:
 determining a first quantity of reductant to supply to the first exhaust conduit and a second quantity of reductant to supply to the second exhaust conduit;
 timing an injection of the first quantity of reductant by the reductant injector in order to coincide with a first predetermined engine crank angle; and
 timing an injection of the second quantity of reductant by the reductant injector in order to coincide with a second predetermined engine crank angle.

By timing the supply of reductant to coincide with predetermined crank angles, the reductant can be controllably distributed between exhaust conduits in any proportion desirable, using only a single reductant injector.

The first predetermined crank angle may coincide with the second exhaust conduit having a second transient pressure that is higher than a first transient pressure in the first exhaust conduit, and the second predetermined crank angle may coincide with the first exhaust conduit having a first transient pressure that is higher than a second transient pressure in the second exhaust conduit; wherein the first and second transient pressures are determined at a position upstream of the first and second turbocharger turbine inlets respectively. By utilizing the pressure difference between the exhaust conduits, an exhaust flow capable of transporting reductant from the distributor pipe to an exhaust conduit is established in the distributor pipe. The direction of the transporting exhaust flow alternates periodically as a function of crank angle, meaning that it is simple to distribute reductant between both exhaust conduits by timing the injection of reductant.

The first quantity of reductant or the second quantity of reductant may be zero, i.e. 100% of the reductant may be supplied to the first exhaust conduit or second exhaust conduit. Alternatively, a proportional split of reductant, such as 50/50 may be achieved if desired. The proportion supplied to each conduit can be varied continuously throughout operation as desired.

A final injection of reductant may be made at least one half engine crank cycle prior to shutoff of the internal combustion engine. This allows a final flow of exhaust fluid through the distributor pipe to clear any remaining reductant from the reductant injector nozzle and distributor pipe. Thus, the reductant supply system may be maintained free of deposits without the need for a pressurized air source or similar apparatus for clearing the injector nozzle.

According to a further aspect of the present invention, the objects of the present invention are achieved by a vehicle comprising an exhaust system as disclosed herein.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

The present invention is based upon the realization by the inventors that a reductant can be transported into an exhaust stream of an internal combustion engine (henceforth "engine") using the pressure pulses, so-called blow-down pulses, which arise whenever the exhaust valves of the engine cylinders open. In order to utilize these blow-down pulses, the exhaust stream coming from the engine must be divided between at least two separate exhaust conduits. A reductant distributor pipe running between the at least two exhausts conduits may then be pressurized from one side by overpressure in the first exhaust conduit, and pressurized from the other side by overpressure in the second exhaust conduit. If reductant is present in the distributor pipe, overpressure in the first exhaust conduit blows reductant into the second exhaust conduit, and vice-versa, overpressure in the second exhaust conduit blows reductant into the first exhaust conduit. A single reductant injector arranged to deposit reductant into the reductant distributor pipe may then be used to controllably provide reductant to both exhaust banks by timing the supply of reductant to coincide with overpressure working in the desired direction. The reductant injector itself is therefore remote from the main exhaust flow and is not fully exposed to the demanding conditions caused by the high exhaust temperatures.

The internal combustion engine may be any internal combustion engine, but is preferably a four-stroke combustion engine, even more preferably a compression ignition four-stroke combustion engine. The engine may be used in any application commonly known for internal combustion engines. It may for example be merchandized as a free-standing engine, for use for example in power generation or industrial settings. However, application in a vehicle is preferred. By vehicle it is meant any machine utilizing an internal combustion engine to provide motive force, either directly, or indirectly as in the case of series hybrid vehicles. This includes, but is not limited to, motor vehicles such as cars, trucks and buses; railed vehicles such as trains and trams; watercraft such as ships and boats; and aircraft.

The exhaust system of the present invention will now be described in greater detail.

The exhaust system serves at least two separate exhaust banks. By exhaust bank, it is meant the exhaust output from a number of engine cylinder exhaust valves converging to a single exhaust stream. An exhaust bank may correspond to an engine cylinder bank. For example, in two-bank engines such as those having a V-configuration, each exhaust bank may correspond to a separate cylinder bank. However, a single engine bank may also correspond to multiple exhaust banks. For example, an inline engine having only a single cylinder bank may have two or more corresponding exhaust banks, each exhaust bank receiving exhaust from a fraction of the total number of cylinders.

The exhaust arising from each exhaust bank is collected in separate exhaust conduits. The end of the exhaust conduit associated with the exhaust bank typically comprises an exhaust manifold, the manifold having manifold pipes arranged to gather the exhaust from each cylinder separately and converging in a collector pipe. Each exhaust conduit may be manufactured separately. However, multiple exhaust conduits may be manufactured as a single piece, or from separate pieces fixedly attached to each other.

Each exhaust conduit leads to a separate inlet for a turbocharger turbine. The presence of a turbocharger turbine provides a resistance to pressure equalization in each exhaust conduit, meaning that each pressure peak generated by release of exhaust fluid from an exhaust vent has a longer duration and/or magnitude as compared to systems lacking a turbocharger. The use of separate inlets prevents pressure equalization between the first and second exhaust conduits at the point of convergence. It is essential that the two exhaust conduits can maintain different pressures for at least a finite duration in order to utilize this pressure differential for transporting reductant to either one of the exhaust conduits.

The system may comprise a single turbocharger having two inlets, i.e. a twin scroll or pulse turbocharger. In such a case, each exhaust conduit leads to a discrete inlet of a shared turbocharger. The system may comprise two turbochargers arranged in parallel, i.e. twin-turbo or bi-turbo designs. In such a case, each exhaust bank leads to a single inlet of a discrete turbocharger. For systems having more than two exhaust banks, combinations of twin-scroll and parallel twin-turbo designs are possible.

If utilizing a single turbocharger having two inlets, the turbine inlets may have differing geometries in order to optimize the performance of the turbo. For instance, the diameter of one inlet may be smaller than the other. The smaller diameter inlet may direct the exhaust stream towards the inner surface of the turbine blades in order to improve turbocharger response, i.e. reduce "turbo lag". The larger diameter inlet may direct the exhaust stream to the outer edge of the turbine blades, improving the turbine efficiency. The use of inlet channels of differing geometries may lead to differing dosing quantities of reductant being required for each inlet.

The turbocharger may be equipped with one or more wastegates. The wastegate may be an internal wastegate, incorporated into a turbine inlet, or it may be an external wastegate, arranged in the exhaust conduit upstream of the turbine inlet. The exhaust system may be equipped with a single wastegate, arranged in association with one of the turbine inlets, or it may be equipped with one wastegate per turbine inlet.

Twin scroll turbochargers have a single exhaust outlet, i.e. the first and second exhaust streams have merged in the turbine, whereas parallel twin-turbo configurations typically have a separate outlet for each turbo. The exhaust conduits leading the exhaust stream away from the twin-turbo may be arranged to merge downstream of the turbos, or they may remain as separate exhaust conduits, each leading to separate SCR catalyst arrangements.

At least one SCR catalyst arrangement is arranged downstream of the turbocharger in each exhaust conduit. The SCR catalyst arrangement comprises at least one catalyst support, but may have a number of supports or "bricks" arranged in parallel. Suitable materials for SCR catalysts are known in the art.

The exhaust system may comprise further components as known in the art. For example, the system may be equipped with a further turbocharger arranged in series in the exhaust conduit, i.e. two-stage turbocharging. The system may be equipped with a number of sensors, including but not limited to temperature sensors, $NO_x$ sensors, HC sensors, CO sensors, and combinations thereof. The system may be equipped with further catalysts, for example diesel oxidation catalysts and ammonia slip catalysts. The system may even be equipped with further SCR components, such as reductant injectors, mixers and SCR catalysts.

The exhaust system is equipped with a reductant supply system for supplying reductant to the exhaust streams upstream of the turbine inlets. The reductant supply system comprises a distributor pipe and an injector system.

The injector system is arranged to supply reductant centrally to the distributor pipe. The injector system comprises a reductant injector arranged to supply a metered amount of reductant to the distributor pipe. The reductant injector may be fluidly connected to a reductant storage tank via a pressurizing device such as a pump. The injector system may also comprise a control unit for controlling the timing and dosage of the reductant supply to the distributor pipe. The control unit may be in communication with sensors and/or further control units in the vehicle. Such injector systems are known in the art.

The distributor pipe is arranged to run between the first exhaust conduit and the second exhaust conduit. Each end of the distributor pipe is suitably arranged to meet the exhaust conduit at a location downstream of where the manifold pipes have converged, for example at the collector pipe, at the turbine inlet, or at any intermediate position. The distributor pipe is of a suitable diameter to allow any supplied reductant to be blown into an exhaust stream by pressure differentials acting over the two exhaust conduits. If the distributor pipe is too narrow in diameter it may comprise a volume too small to accommodate the supplied reductant, potentially leading to undesired spill-over into both exhaust conduits or excessive back-pressure being applied to the injector. If the distributor pipe is too large in diameter it will act to equalize the pressure difference between the two exhaust conduits without necessarily transporting the reductant in the desired manner. The ratio of the cross sectional area of the distributor pipe to the cross sectional area of the first exhaust conduit at the point where the distribution pipe meets the first exhaust conduit may for example be from about 0.1% to about 30%, such as from about 1% to about 20%, or from about 5% to about 15%. The distributor pipe may be a straight length of pipe fluidly connecting the two exhaust conduits. However, it may also be formed with a U-shaped dip in the middle in order to hinder undesired spillage of the reductant into the "wrong" exhaust conduit.

Measures may be taken to protect the reductant injector from excessive heat and ensure that the reductant is not subjected to degradation as far as possible. A thermal insulation material may be arranged at each end of the distributor pipe, between the distributor pipe and the wall of the exhaust conduit, in order to reduce the temperature prevailing in the distributor pipe. The distributor pipe may also be equipped with a cooling sleeve overlaying the circumference of the distributor pipe and configured to circulate a source of cooling fluid through the cooling sleeve. The cooling fluid may be air. The cooling sleeve may be connected to the standard engine cooling system, in which case the cooling fluid is the cooling fluid of the engine cooling system. Alternatively, reductant from the reductant storage tank may be circulated through the cooling sleeve. This fills two functions. Firstly, the distribution pipe is cooled, thus protecting the reductant and reductant supply system from the excessive exhaust temperatures. On the other hand, the reductant in the reductant storage tank is heated somewhat, reducing the risk of freezing and possibly precluding the need for a separate heater arranged in the reductant supply tank.

These measures combined protect the reductant supply system from the high exhaust temperatures and provide conditions suitable for the avoidance of by-products. This is because the reductant when supplied to the distribution tube is exposed to temperatures much lower than the temperatures required to form by-products. Upon being blown into the exhaust stream, the high temperatures and sharp temperature gradient that the reductant is exposed to will reduce the incidence of by-product formation. The reductant is preferably diesel exhaust fluid comprising a solution of urea in water, in accordance with standard AUS 32 of ISO 22241.

Although the invention is described herein as applied to systems having two exhaust conduits, it may also be applied to systems having a greater number of exhaust conduits, such as three or four exhaust conduits. In such a case, each exhaust conduit should be connected with at least one other exhaust conduit by a distribution pipe. Each distribution pipe should be equipped with a reductant injector.

The exhaust system described above may be used to controllably supply reductant to the two exhaust conduits, and thus to the SCR catalyst. Ignoring potential variations caused by variable valve timing, the exhaust valve of each cylinder of a four-stroke internal combustion engine opens with a periodicity of 720° crank angle (i.e. two entire crank rotations). With each opening of an exhaust valve, a transient pressure maximum is caused by the release of the compressed exhaust gas from the cylinder into the exhaust conduit. For example, in a six-cylinder engine having two exhaust banks of three cylinders, each exhaust conduit experiences three transient pressure peaks every two full crank rotations (720° crank angle). Because the cylinder timings are offset with regard to each other, the transient pressure peaks in the two exhaust conduits are also offset, since no two cylinders vent simultaneously. This offset between the two exhaust conduits due to the fact that the exhaust banks are typically arranged so that the cylinder firing sequence leads to exhaust being vented alternatingly into each exhaust bank in a sequence—bank 1-bank 2-bank 1-bank 2-bank 1-bank 2—and so on. The consequence of this offset is that when one exhaust bank is experiencing a transient peak pressure, the other exhaust bank is in a trough between transient peaks. Thus, a pressure differential arises between the two exhaust conduits, and this pressure differential sequentially alternates between overpressure in the first exhaust conduit and overpressure in the second exhaust conduit as a function of crank angle.

The exhaust system described above is equipped with a reductant supply system comprising a distributor pipe and an injector that controllably supplies reductant to the distributor pipe. The distributor pipe fluidly connects the first exhaust conduit to the second exhaust conduit. Thus, during periods of transient overpressure in the first exhaust conduit, exhaust gas will flow through the distributor pipe from the first exhaust conduit to the second exhaust conduit. Likewise, during periods of transient overpressure in the second exhaust conduit, exhaust gas will flow through the distributor pipe from the second exhaust conduit to the first exhaust conduit. Therefore, the direction of fluid flow in the distributor pipe periodically alternates as a function of crank angle. If reductant is supplied to the distributor pipe, this reductant will be transported by the fluid flow towards the exhaust conduit having the lowest pressure. Therefore, reductant can be controllably supplied to the first exhaust conduit, the second exhaust conduit, or both, by controlling the timing of the reductant injector with respect to crank angle.

Preferably, injections of reductant are timed to coincide with a maximum pressure differential acting across the two exhaust conduits. For example, a first injection may occur immediately prior to the maximum differential pressure, a second injection may occur concurrently with the maximum differential pressure, and a third injection may occur immediately after the maximum differential pressure. This allows the maximum transporting force between exhaust conduits to be utilized, reduces the risk of deposits forming in the distributor pipe, and acts to prevent accidental overflow of reductant into the "wrong" exhaust conduit. The volume supplied by each injection depends on the desired mass flow of reductant to each exhaust conduit, and with high mass flows injections may be required that do not correlate with the maximum differential pressure.

The exhaust stream upstream of the turbine inlets routinely reaches temperatures in excess of 400° C., meaning that the reductant supplied is rapidly evaporated, high mass flows of reductant are achievable and essentially no urea deposits are formed on the walls of the exhaust conduit. Passing the mixture of exhaust gas and reductant through the turbo turbines ensures highly effective mixing of the reductant, without the need for further mixers downstream of the turbine.

The reductant may be distributed between exhaust conduits or controllably supplied to only one of the conduits. For example, if the inlet geometry differs between the first turbine inlet and the second turbine inlet, as is commonly the case with twin-scroll turbochargers, then an unequal distribution of reductant between the two conduits may be desired. This may be achieved by controlling the injection timing and injection volume to each respective conduit. In another example, only one of the exhaust conduits may be equipped with a wastegate. In such a case, in order to avoid the reductant bypassing the turbine, it may be desirable to avoid supplying reductant to the exhaust conduit fitted with a wastegate whilst the wastegate is open.

A known drawback of conventional reductant injection systems is that the nozzle of the injector may become clogged with urea deposits. In order to avoid such deposits, the nozzle is commonly blown clean using compressed air after the last injection prior to shutoff. However, this necessitates a source of compressed air, which is not readily available in some applications such as marine engines. According to the present invention, the nozzle of the reductant injector and the distributor pipe may be cleared using the periodically alternating gas flow arising in the distributor pipe. Therefore in order to clear the nozzle and pipe, the final reductant injection is performed with a sufficient margin prior to the final pressure differential maximum between the exhaust conduits, in order to allow the pressure differential to clear the nozzle. Exactly how long in advance of engine shutoff the final injection must be performed in order to ensure a final pressure differential depends on the number of cylinders and the number of exhaust banks. For example, a four cylinder engine having two exhaust banks experiences a maximum pressure differential every half crank cycle (180°). Therefore, the final injection may be performed at least one half crank cycle prior to engine shutoff. In order to allow several differential pressure maximums to clear the injector nozzle and distributor pipe, the final injection may be performed with a greater margin prior to engine shutoff, such as for example, one, two, or three crank cycles prior to engine shutoff.

The present invention will now be further illustrated with reference to the appended figures.

Figure 1:
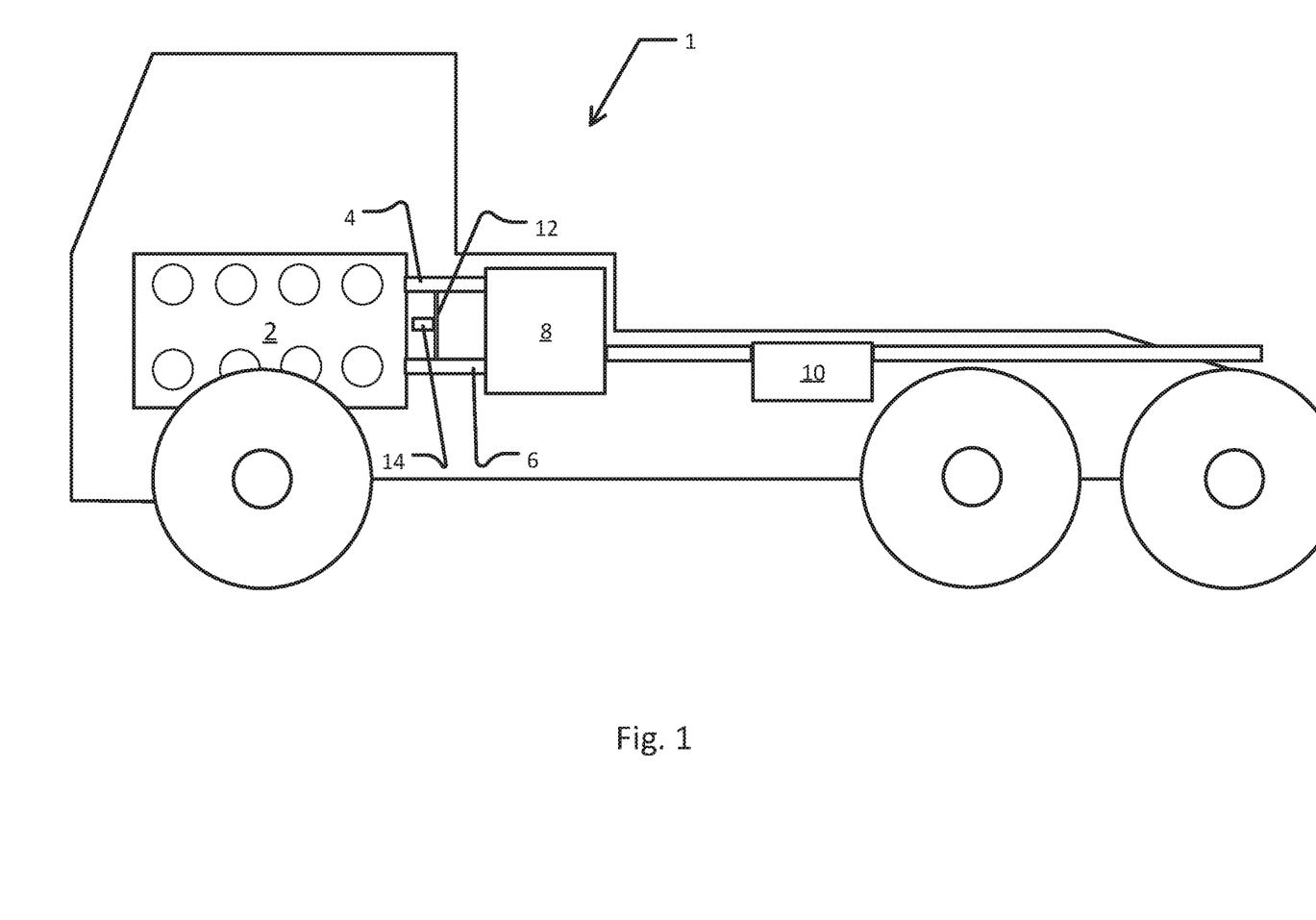
FIG. 1 schematically illustrates a vehicle comprising an exhaust system according to an embodiment of the present invention.

FIG. 1 shows schematically a side view of a vehicle 1 according to an embodiment of the invention. The vehicle 1 includes a combustion engine 2, a first exhaust conduit 4 servicing a first bank of engine cylinders, a second exhaust conduit 6 servicing a second bank of engine cylinders, a twin-inlet turbocharger 8, and an SCR catalyst 10. A distributor pipe 12 equipped with a reductant injector 14 is arranged between the first exhaust conduit 4 and second exhaust conduit 6. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
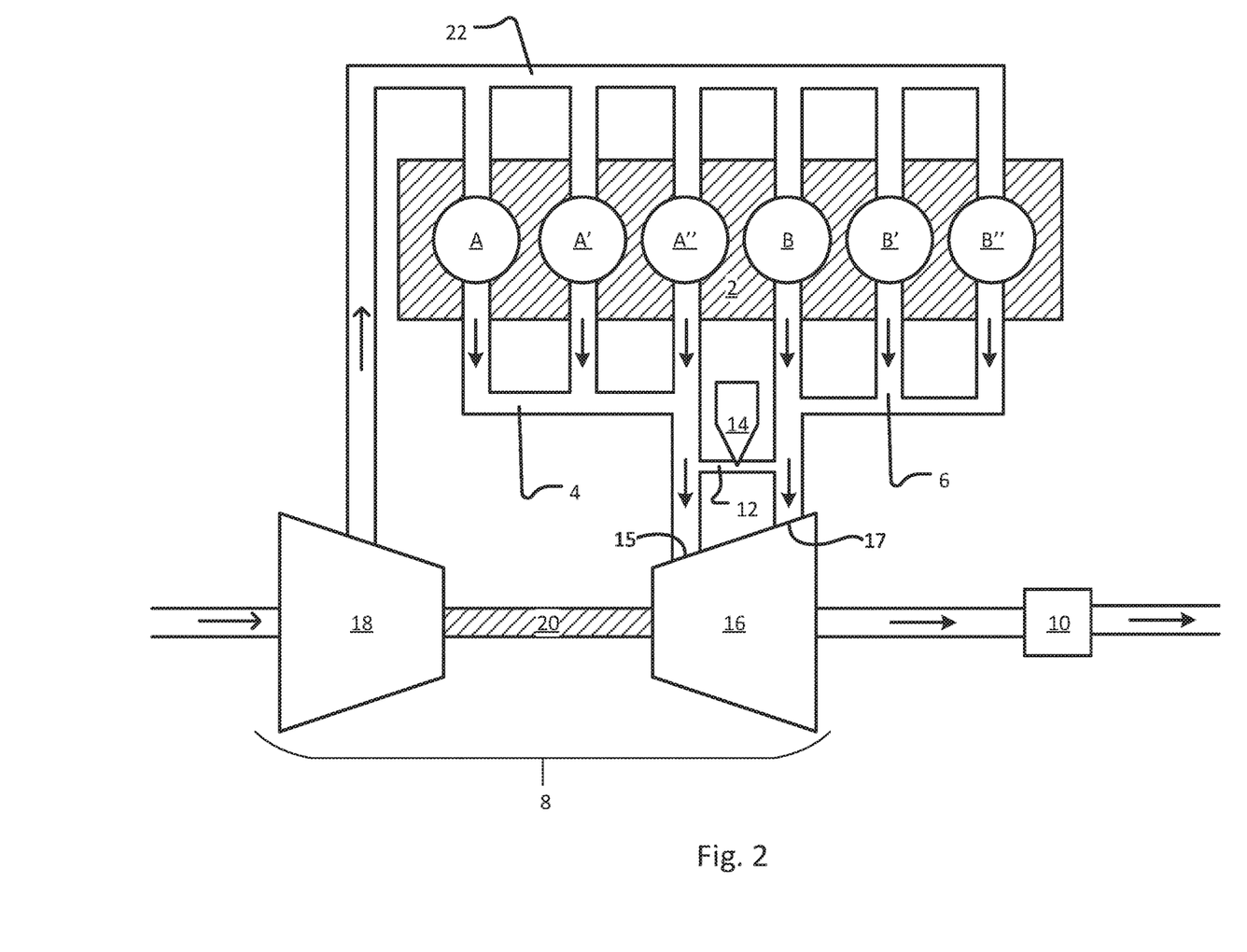
FIG. 2 schematically illustrates an exhaust system according to an embodiment of the present invention.

FIG. 2 shows schematically an exhaust system for an internal combustion engine, according to an embodiment of the invention. The internal combustion engine 2 has two exhaust banks, the first exhaust bank comprising of cylinders A, A' and A" and the second exhaust bank comprising cylinders B, B' and B". The first exhaust bank is serviced by a first exhaust conduit 4, and the second exhaust bank is serviced by a second exhaust conduit 6. The engine exhaust stream is represented by filled arrows. The first exhaust conduit 4 leads the engine exhaust stream from the first exhaust bank to a first inlet 15 of turbocharger turbine 16, and the second exhaust conduit 6 leads the exhaust stream from the second exhaust bank to a second inlet 17 of turbocharger turbine 16. After passing through the turbine 16, the now combined exhaust stream exits the outlet of turbocharger turbine 16 and flows through SCR catalyst 10 before being vented to the atmosphere. The turbocharger turbine drives a turbocharger compressor 18 via shaft 20. Intake air is represented by open arrows. The compressor 18 takes air from the atmosphere via an intake inlet and provides the compressed air to the engine intake manifold 22, where it is supplied to the cylinders A, A', A", B, B', B". The exhaust system of the present invention is equipped with a reductant supply system comprising a distributor pipe 12 and a reductant injector 14. The distributor pipe 12 fluidly connects the first exhaust conduit 4 to the second exhaust conduit 6. The reductant injector 14 supplies reductant to the distributor pipe 12.

Figure 3A:
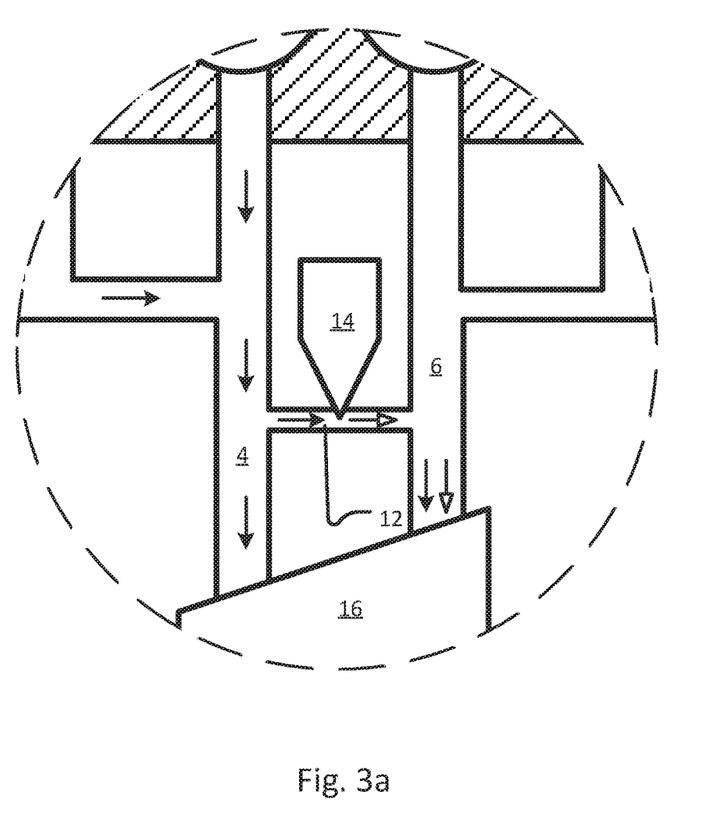
FIG. 3a schematically illustrates supplying reductant to the second exhaust conduit of the exhaust system.
Figure 3B:
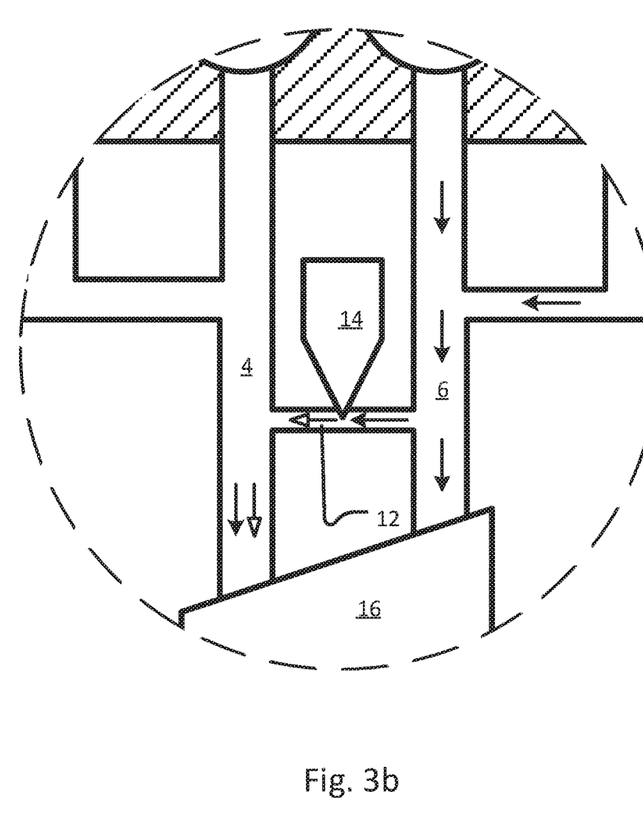
FIG. 3b schematically illustrates supplying reductant to the first exhaust conduit of the exhaust system.

FIGS. 3a and 3b schematically illustrate the functioning of the reductant supply system in the exhaust system of FIG. 2. Filled arrows illustrate the flow of exhaust fluids, non-filled arrows illustrate the flow of reductant.

In FIG. 3a, one of the cylinders A, A' or A" belonging to the first exhaust bank is venting to the first exhaust conduit 4. This causes an overpressure in the first exhaust conduit 4 relative to the second exhaust conduit 6. Distributor pipe 12 fluidly connects first exhaust conduit 4 to second exhaust conduit 6. Due to the pressure difference arising between the two conduits, exhaust flows through the distributor pipe 12, from the higher pressure first exhaust conduit 4 to the lower pressure second exhaust conduit 6. Reductant (non-filled arrows) supplied to the distributor pipe 12 by the reductant injector 14 is transported by the exhaust fluid flow through the distributor pipe 12 and into the second exhaust conduit 6, where it is vaporized. In this manner, reductant can be selectively supplied to the second exhaust conduit 6.

In FIG. 3b, one of the cylinders B, B' or B" belonging to the second exhaust bank is venting to the second exhaust conduit 6. This causes an overpressure in the second exhaust conduit 6 relative to the first exhaust conduit 4. Distributor pipe 12 fluidly connects first exhaust conduit 4 to second exhaust conduit 6. Due to the pressure difference arising between the two conduits, exhaust flows through the distributor pipe 12, from the higher pressure second exhaust conduit 6 to the lower pressure first exhaust conduit 4. Reductant (non-filled arrows) supplied to the distributor pipe 12 by the reductant injector 14 is transported by the exhaust fluid flow through the distributor pipe 12 and into the first exhaust conduit 4, where it is vaporized. In this manner, reductant can be selectively supplied to the first exhaust conduit 4.

It should be noted that the reductant injector is located remotely from the bulk exhaust flow and therefore is not subjected to the severe conditions that an injector supplying reductant directly to the exhaust conduits would face. Only a single injector is required for selectively supplying reductant to both exhaust conduits. Because reductant is supplied where exhaust temperatures are extremely high, by-product formation from the reductant is lessened and high mass flows of reductant can be achieved. The longer path to reach the SCR catalyst 10, combined with the reductant/exhaust mixture being passed through the turbocharger turbine 16, results in a highly effective distribution of reductant in the exhaust stream. This means that the SCR catalyst 10 is effectively utilized over its entire surface, and that there is no need for a mixer in the exhaust conduits 4, 6.

Figure 4:
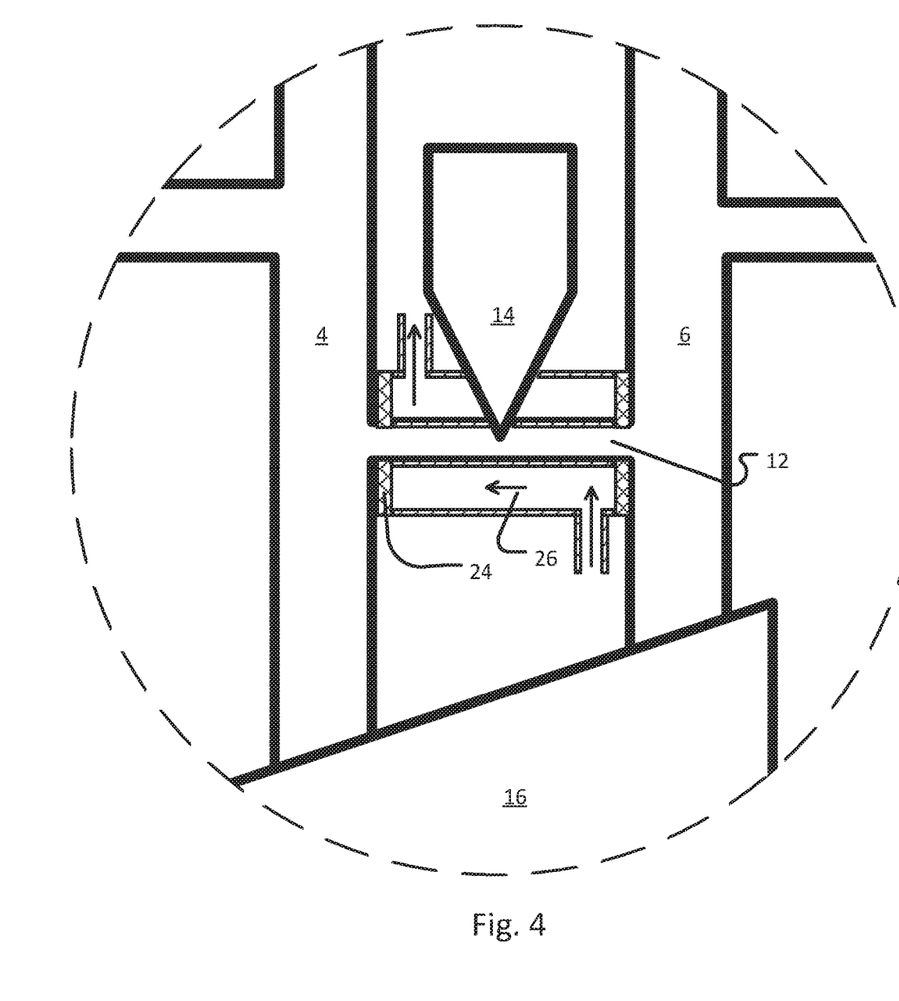
FIG. 4 schematically illustrates an actively cooled distributor pipe in an exhaust system.

The temperature profile of the reductant supply system may be improved further. FIG. 4 schematically shows the distributor pipe 12 fluidly connecting the exhaust conduits 4, 6. Thermally insulating material 24 separates the ends of the walls of the distributor pipe 12 from the walls of exhaust conduits 4, 6. The distributor pipe 12 is equipped with a cooling sleeve 26 that surrounds the distributor pipe 12. A fluid, indicated by arrows in the Figure, circulates through the cooling sleeve, thus cooling the distributor pipe 12 and reductant injector 14. The fluid may be the cooling fluid from the engine cooling system, or it may be a reductant solution circulated from a reductant storage tank. By thermally insulating the distributor pipe 12 from the hot exhaust conduits 4, 6 and by cooling the distributor pipe 12, the temperature in the distributor pipe and nozzle of the reductant injector 14 is maintained below the lower boundary temperature for formation of by-products from the reductant solution. Whenever reductant is supplied to the distributor pipe 12, it is first subjected to the cooler temperatures of the distributor pipe 12 before being transported into one of the exhaust conduits 4, 6. A sharp temperature gradient exists at the boundary of the cooled distributor pipe 12 and the exhaust conduits 4, 6, and therefore the reductant, upon entering the exhaust conduit 4, 6 is rapidly heated to temperatures above the upper boundary temperature for formation of by-products.

Figure 5:
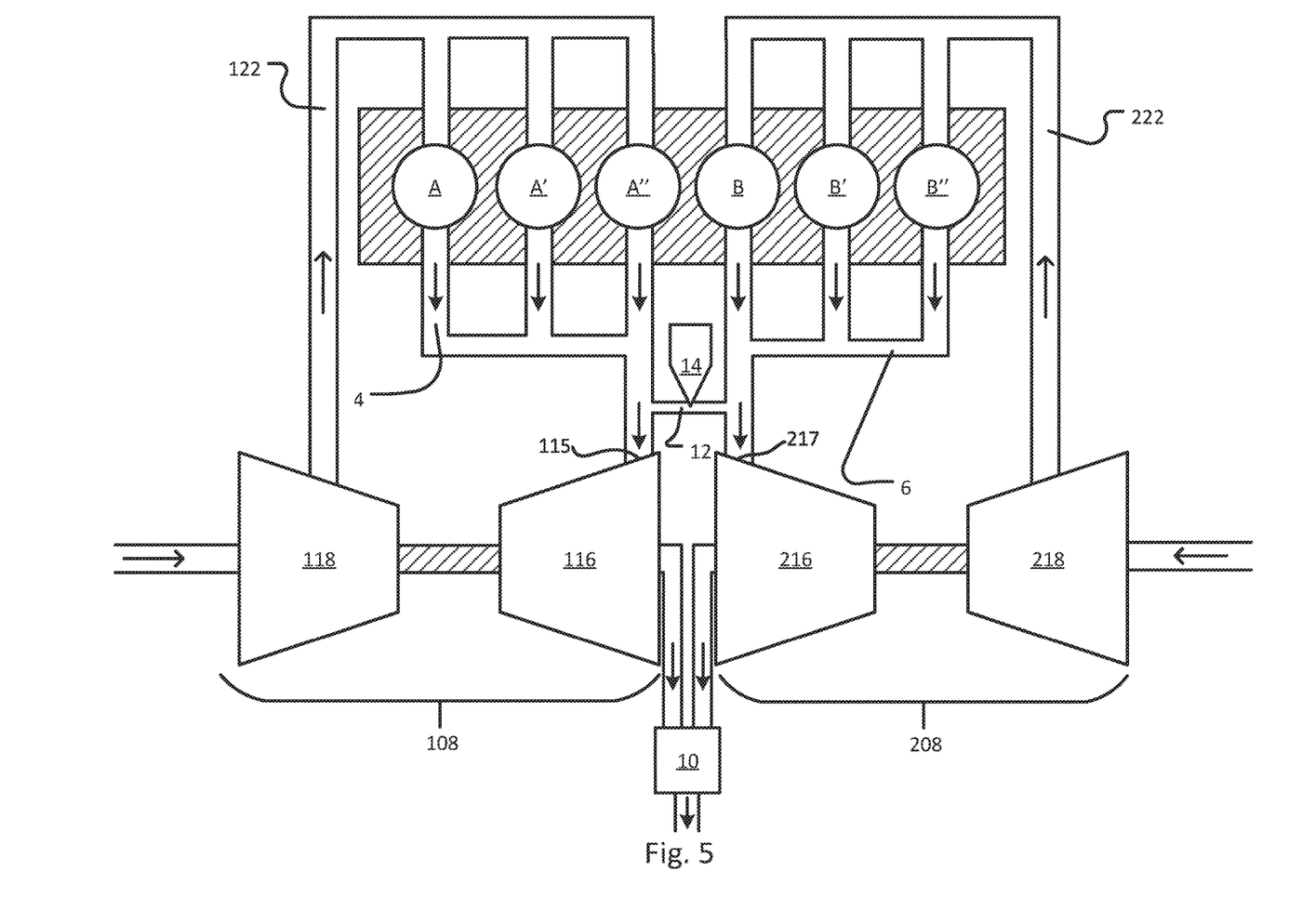
FIG. 5 schematically illustrates an exhaust system according to another embodiment of the present invention.

FIG. 5 schematically illustrates another embodiment of an exhaust system according to the present invention. In this embodiment, the internal combustion engine 2 is equipped with two separate turbochargers 108, 208. The first exhaust conduit leads to the turbine 116 of the first turbocharger 108 and the second exhaust conduit leads to the turbine 216 of the second turbocharger 208. The exhaust conduits 4, 6 exit the respective turbines 116, 216 separately and convey exhaust fluids to SCR catalyst 10. In the SCR catalyst 10 the exhaust conduits merge, and a single outlet exits the SCR catalyst 10 for venting exhaust fluids to atmosphere.

Figure 6:
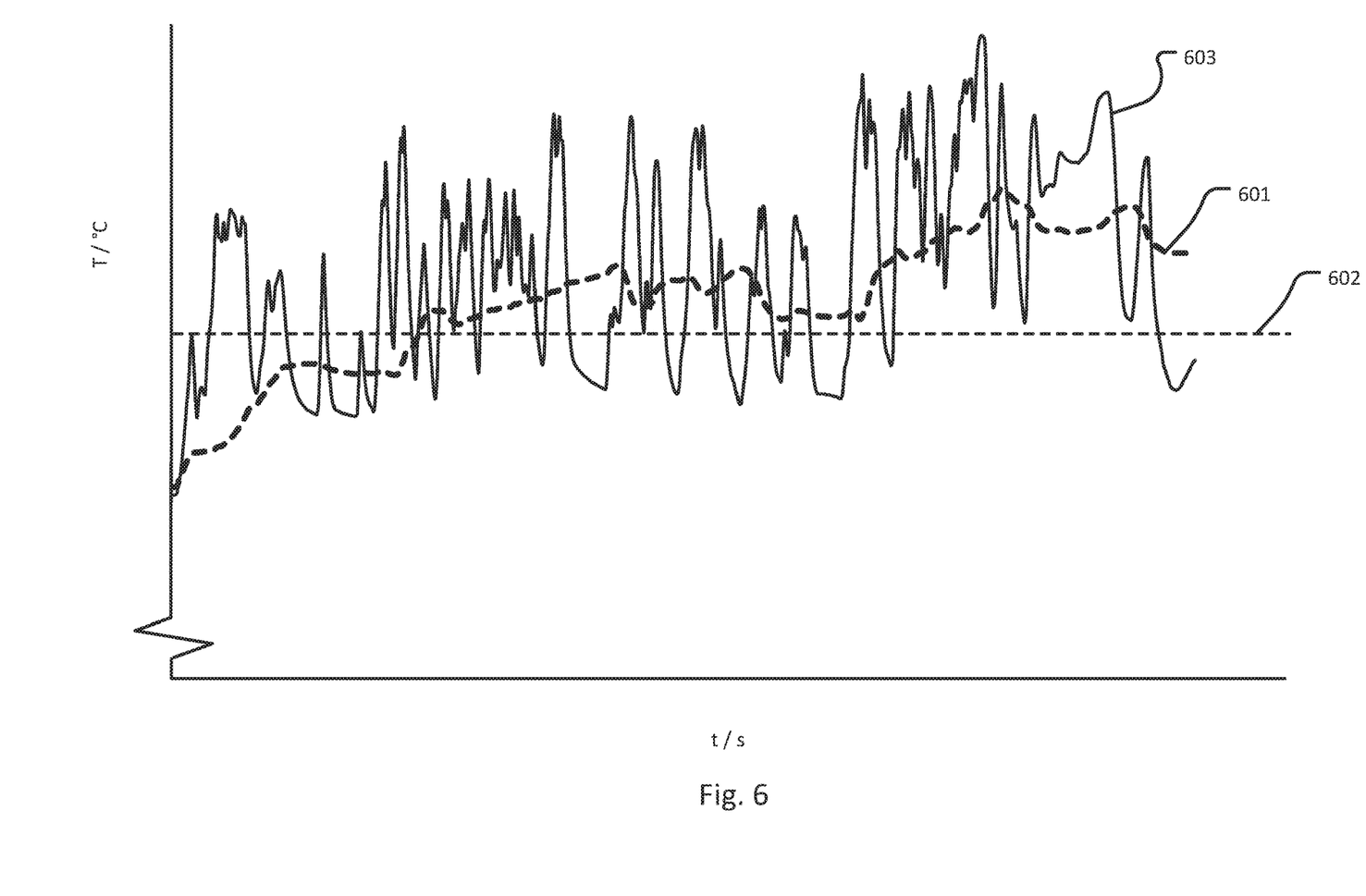
FIG. 6 is a graph representing the variation of temperature with time during a drive cycle at two separate points in the exhaust system.

FIG. 6 illustrates the higher temperatures obtainable when supplying reductant upstream of the turbocharger turbine for a normal driving cycle. Line 601 shows the temperature at the prior art dosing point downstream of the turbocharger turbine. Line 602 represents the minimum dosing temperature of 200° C. Line 603 shows the temperature at a point upstream of the turbocharger turbine. It can be seen that a dosing point upstream of the turbine reaches temperatures in excess of the minimum dosing temperature of 200° C. much more rapidly than compared to downstream of the turbine. Moreover, the temperatures attained upstream of the turbine are frequently much higher than those downstream of the turbine. This means that dosing upstream of the turbine is preferable with regard to reducing by-product formation and permitting high mass flows of reductant to be added to the exhaust stream.

Figure 7:
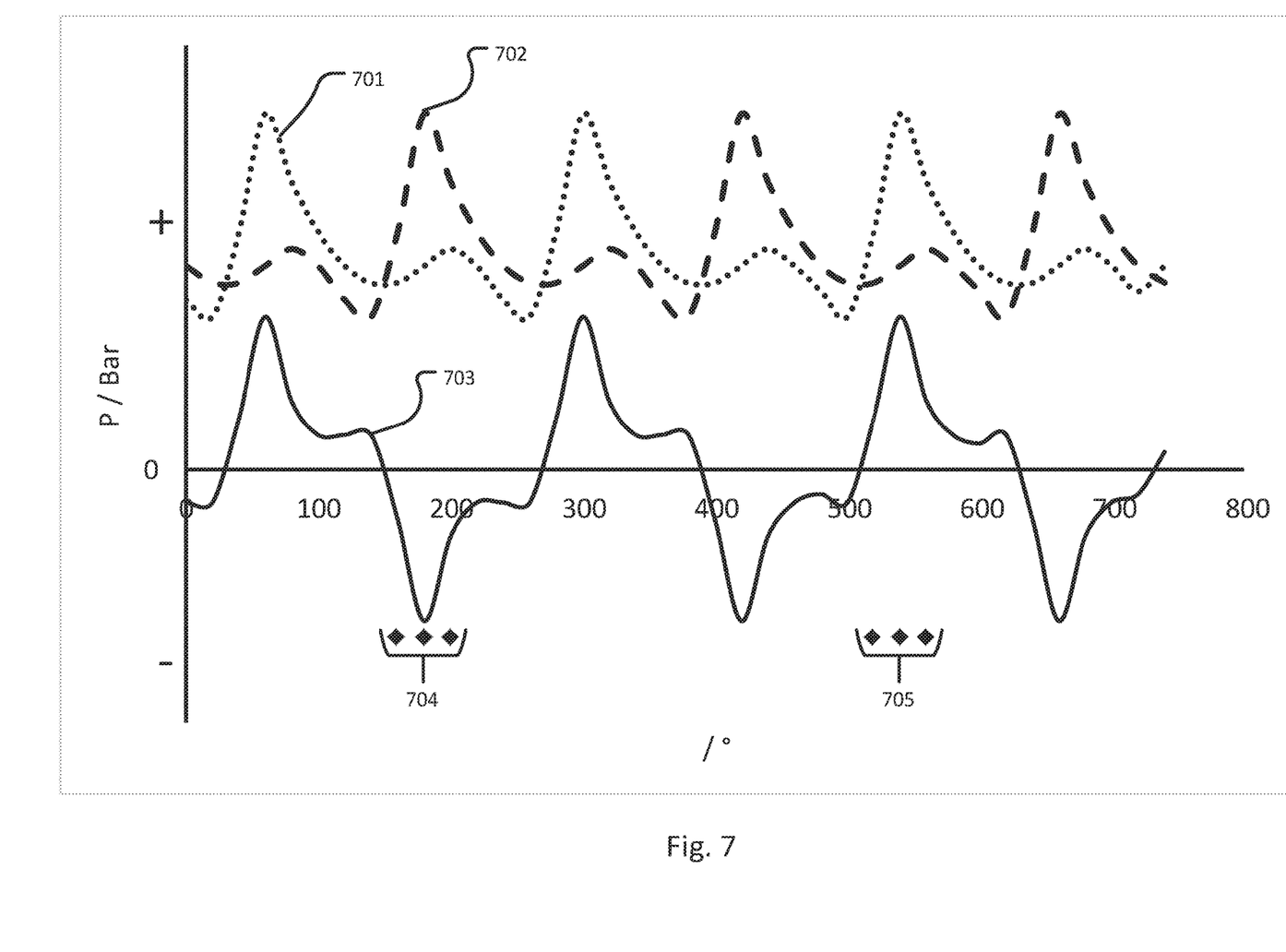
FIG. 7 is a graph representing the variation of pressure with crank angle in each of the exhaust conduits of the exhaust system.

FIG. 7 illustrates how the pressure fluctuates in the exhaust conduits of a six-cylinder engine having two exhaust banks. The x-axis of the graph represents the cumulative crank angle, the y-axis represents pressure in Bar. Line 701 shows the pressure in the first exhaust bank, line 702 shows the pressure in the second exhaust bank, and line 703 shows the differential pressure between the first and second exhaust banks. It can be seen that the pressure in each exhaust bank varies periodically with 240° between each pressure maximum in a single bank. The pressure maxima in the second bank, line 702, are offset with respect to the pressure maxima in the first bank, line 701, by 120° C. This means that every 120° there is a pressure maximum in one of the exhaust banks in an alternating sequence: b1-b2-b1-b2-b1-b2, and so on. The consequence of such a sequence is seen in line 703 which shows the differential pressure between the first bank and the second bank. It can be seen that the differential pressure alternates periodically between a maximum overpressure in the first exhaust bank and a maximum overpressure in the second exhaust bank, with 120° separating each pressure maximum.

If a distributor pipe is arranged between the two exhaust banks, the pressure difference obtained between the two banks is sufficient to blow any reductant deposited in the distributor pipe into the bank having the lowest pressure at the time of deposition. FIG. 7 illustrates two series of three injections (points 704 and 705). The first series of three injections, points 704, take place around a pressure maximum in the second exhaust bank, and therefore any reductant supplied to the distributor pipe during these injections will be transported to the first exhaust bank. The second series of three injections, points 705, take place around a pressure maximum in the first exhaust bank, and therefore any reductant supplied to the distributor pipe during these injections will be transported to the second exhaust bank. By controlling the amount of reductant supplied by each injection, the distribution of reductant between exhaust conduits can be regulated between 100% in the first exhaust conduit to 100% in the second exhaust conduit, or any distribution in between.

Figure 8:
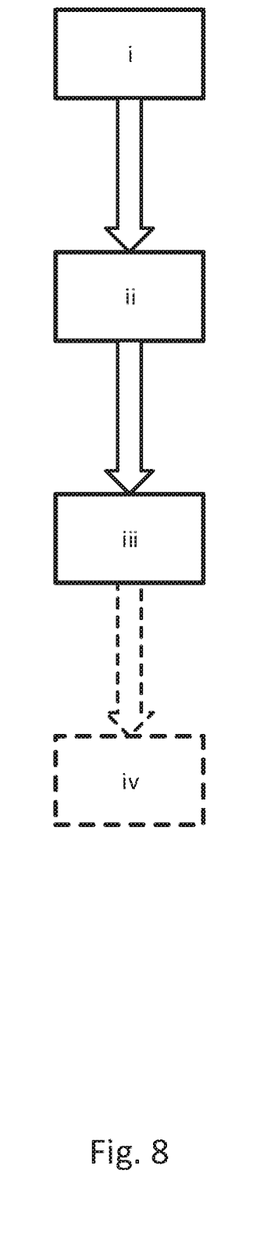
FIG. 8 is a flowchart illustrating the steps in a method of supplying a reductant to an exhaust stream of an exhaust system according to the present invention.

FIG. 8 shows a flowchart for a method of supplying a reductant to an exhaust stream of an exhaust system for an internal combustion engine according to the present invention.

In step i. of the method, a first quantity of reductant to supply to the first exhaust conduit and a second quantity of reductant to supply to the second exhaust conduit is determined. In some instances, it may be desirable to not add any reductant, i.e. zero reductant, to one or the other of the exhaust conduits. This may for example be the case whenever a wastegate is open in one of the exhaust conduits.

In step ii., an injection of the first quantity of reductant by the reductant injector is timed in order to coincide with a first predetermined engine crank angle. This first predetermined crank angle coincides with the second exhaust conduit having a second transient pressure that is higher than a first transient pressure in the first exhaust conduit. For example, referring to the graph of FIG. 7, the first predetermined crank angle may for example be 180°, 420° or 660° for the system exemplified by FIG. 7. The injection may coincide with a maximum negative magnitude of differential pressure between the two exhaust conduits.

In step iii., an injection of the second quantity of reductant by the reductant injector is timed in order to coincide with a second predetermined engine crank angle. This second predetermined crank angle coincides with the first exhaust conduit having a first transient pressure that is higher than a second transient pressure in the second exhaust conduit. For example, referring to the graph of FIG. 7, the second predetermined crank angle may for example be 60°, 300° or 540° for the system exemplified by FIG. 7. The injection may coincide with a maximum positive magnitude of differential pressure between the two exhaust conduits.

In an optional step iv., a final injection of reductant is made at least one half engine crank cycle prior to shutoff of the internal combustion engine. This ensures that at least one final differential pressure maximum after the final injection can clear the distributor pipe and nozzle of the reductant injector from reductant, thus ensuring that the distributor pipe and nozzle do not become clogged.

The invention claimed is:

1. An exhaust system for an internal combustion engine, the exhaust system comprising:
a first exhaust conduit leading from a first exhaust bank of the internal combustion engine to a first turbocharger turbine inlet arranged downstream of the first exhaust bank in the direction of travel of a first exhaust stream;
a second exhaust conduit leading from a second exhaust bank of the internal combustion engine to a second turbocharger turbine inlet arranged downstream of the second exhaust bank in the direction of travel of a second exhaust stream;
an SCR catalyst arranged downstream of the first turbocharger turbine inlet and/or second turbocharger turbine inlet;
a reductant supply system comprising a distributor pipe and a reductant injector, wherein the distributor pipe is configured to fluidly connect the first exhaust conduit to the second exhaust conduit upstream of the first turbocharger turbine inlet and second turbocharger turbine inlet, and wherein the reductant injector is configured to supply a reductant to the distributor pipe; and
thermal insulation arranged at a junction of a surface of a first end of the distributor pipe and a surface of the first exhaust conduit, said thermal insulation in contact with the surface of the first end of the distributor pipe and extending along at least a portion of the surface of the first exhaust conduit, to thereby thermally insulate the surface of the distribution pipe from the first exhaust conduit.

2. The exhaust system according to claim 1, wherein the distributor pipe is equipped with a cooling sleeve configured to circulate a fluid through the cooling sleeve.

3. The exhaust system according to claim 2, wherein the cooling sleeve is fluidly connected to a cooling system for the internal combustion engine.

4. The exhaust system according to claim 2, wherein the cooling sleeve is fluidly connected to a reductant storage tank.

5. The exhaust system according to claim 1, wherein the first turbocharger turbine inlet is associated with a first turbocharger turbine and the second turbocharger turbine inlet is associated with a second turbocharger turbine.

6. The exhaust system according to claim 1, wherein a wastegate is arranged in association with the first turbocharger turbine inlet and/or the second turbocharger turbine inlet.

7. The exhaust system according to claim 1, wherein the first turbocharger turbine inlet has a different geometry to the second turbocharger turbine inlet.

8. The exhaust system according to claim 1, wherein a collective exhaust conduit configured to convey the first exhaust stream and second exhaust stream is arranged downstream of the first turbocharger turbine inlet and second turbocharger turbine inlet.

9. The exhaust system according to claim 1 further comprising thermal insulation arranged at a junction of a surface of a second end of the distributor pipe and a surface of the second exhaust conduit and, said thermal insulation in contact with the surface of the second end of the distributor pipe and extending along at least a portion of the surface of the second exhaust conduit.

10. An exhaust system for an internal combustion engine, the exhaust system comprising:

a first exhaust conduit leading from a first exhaust bank of the internal combustion engine to a first turbocharger turbine inlet arranged downstream of the first exhaust bank in the direction of travel of a first exhaust stream;

a second exhaust conduit leading from a second exhaust bank of the internal combustion engine to a second turbocharger turbine inlet arranged downstream of the second exhaust bank in the direction of travel of a second exhaust stream, wherein the first turbocharger turbine inlet and second turbocharger turbine inlet are associated with a single turbocharger turbine;

an SCR catalyst arranged downstream of the first turbocharger turbine inlet and/or second turbocharger turbine inlet; and a reductant supply system comprising a distributor pipe and a reductant injector, wherein the distributor pipe is configured to fluidly connect the first exhaust conduit to the second exhaust conduit upstream of the first turbocharger turbine inlet and second turbocharger turbine inlet, and wherein the reductant injector is configured to supply a reductant to the distributor pipe.

11. A method of supplying a reductant to an exhaust stream of an exhaust system for an internal combustion engine, the exhaust system comprising: a first exhaust conduit leading from a first exhaust bank of the internal combustion engine to a first turbocharger turbine inlet arranged downstream of the first exhaust bank in the direction of travel of a first exhaust stream; a second exhaust conduit leading from a second exhaust bank of the internal combustion engine to second turbocharger turbine inlet arranged downstream of the second exhaust bank in the direction of travel of a second exhaust stream; an SCR catalyst arranged downstream of the first turbocharger turbine inlet and/or second turbocharger turbine inlet; and a reductant supply system comprising a distributor pipe and a reductant injector; wherein the distributor pipe is configured to fluidly connect the first exhaust conduit to the second exhaust conduit upstream of the first turbocharger turbine inlet and second turbocharger turbine inlet, and the reductant injector is configured to supply a reductant to the distributor pipe;

wherein the method comprises the steps:

determining a first quantity of reductant to supply to the first exhaust conduit and a second quantity of reductant to supply to the second exhaust conduit;

timing an injection of the first quantity of reductant by the reductant injector in order to coincide with a first predetermined engine crank angle; and timing an injection of the second quantity of reductant by the reductant injector in order to coincide with a second predetermined engine crank angle.

12. The method of claim 11, wherein the first predetermined crank angle coincides with the second exhaust conduit having a second transient pressure that is higher than a first transient pressure in the first exhaust conduit, and wherein the second predetermined crank angle coincides with the first exhaust conduit having a first transient pressure that is higher than a second transient pressure in the second exhaust conduit; wherein the first and second transient pressures are determined at a position upstream of the first and second turbocharger turbine inlets, respectively.

13. The method according to claim 11, wherein the first quantity of reductant or the second quantity of reductant is zero.

14. The method according to claim 11, wherein a final injection of reductant is made at least one half engine crank cycle prior to shutoff of the internal combustion engine.

15. A vehicle, comprising an exhaust system for an internal combustion engine, wherein said exhaust system comprises:

a first exhaust conduit leading from a first exhaust bank of the internal combustion engine to a first turbocharger turbine inlet arranged downstream of the first exhaust bank in the direction of travel of a first exhaust stream;

a second exhaust conduit leading from a second exhaust bank of the internal combustion engine to a second turbocharger turbine inlet arranged downstream of the second exhaust bank in the direction of travel of a second exhaust stream;

an SCR catalyst arranged downstream of the first turbocharger turbine inlet and/or second turbocharger turbine inlet;

a reductant supply system comprising a distributor pipe and a reductant injector, wherein the distributor pipe is configured to fluidly connect the first exhaust conduit to the second exhaust conduit upstream of the first turbocharger turbine inlet and second turbocharger turbine inlet, and wherein the reductant injector is configured to supply a reductant to the distributor pipe; and thermal insulation arranged at a junction of a surface of a first end of the distributor pipe and a surface of the first exhaust conduit, said thermal insulation in contact with the surface of the first end of the distributor pipe and extending along at least a portion of the surface of the first exhaust conduit, to thereby thermally insulate the surface of the distribution pipe from the first exhaust conduit.

16. The vehicle according to claim 15, wherein the distributor pipe exhaust system is equipped with a cooling sleeve configured to circulate a fluid through the cooling sleeve.

17. The vehicle according to claim 16, wherein the cooling sleeve is fluidly connected to a cooling system for the internal combustion engine.

18. The vehicle according to claim 16, wherein the cooling sleeve is fluidly connected to a reductant storage tank.

19. The vehicle according to claim 15, wherein the first turbocharger turbine inlet and second turbocharger turbine inlet are associated with a single turbocharger turbine.

20. The vehicle according to claim 15, wherein said exhaust system further comprises thermal insulation arranged at a junction of a surface of a second end of the distributor pipe and a surface of the second exhaust conduit and, said thermal insulation in contact with the surface of the second end of the distributor pipe and extending along at least a portion of the surface of the second exhaust conduit.

21. An exhaust system for an internal combustion engine, the exhaust system comprising:

a first exhaust conduit leading from a first exhaust bank of the internal combustion engine to a first turbocharger turbine inlet arranged downstream of the first exhaust bank in the direction of travel of a first exhaust stream;

a second exhaust conduit leading from a second exhaust bank of the internal combustion engine to a second turbocharger turbine inlet arranged downstream of the second exhaust bank in the direction of travel of a second exhaust stream;

an SCR catalyst arranged downstream of the first turbocharger turbine inlet and/or second turbocharger turbine inlet; and a reductant supply system comprising a distributor pipe and a reductant injector, wherein the distributor pipe is configured to fluidly connect the first exhaust conduit to the second exhaust conduit upstream of the first turbocharger turbine inlet and second turbocharger turbine inlet, wherein the distributor pipe is equipped with a cooling sleeve configured to circulate a fluid through the cooling sleeve, and wherein the reductant injector is configured to supply a reductant to the distributor pipe.

22. An exhaust system for an internal combustion engine, the exhaust system comprising:

a first exhaust conduit leading from a first exhaust bank of the internal combustion engine to a first turbocharger turbine inlet arranged downstream of the first exhaust bank in the direction of travel of a first exhaust stream;

a second exhaust conduit leading from a second exhaust bank of the internal combustion engine to a second turbocharger turbine inlet arranged downstream of the second exhaust bank in the direction of travel of a second exhaust stream, wherein the first turbocharger turbine inlet has a different geometry to the second turbocharger turbine inlet;

an SCR catalyst arranged downstream of the first turbocharger turbine inlet and/or second turbocharger turbine inlet; and a reductant supply system comprising a distributor pipe and a reductant injector, wherein the distributor pipe is configured to fluidly connect the first exhaust conduit to the second exhaust conduit upstream of the first turbocharger turbine inlet and second turbocharger turbine inlet, and wherein the reductant injector is configured to supply a reductant to the distributor pipe.

* * * * *